United States Patent Office 3,720,641
Patented Mar. 13, 1973

3,720,641
PROCESS FOR PRODUCING AN IMPROVED WHOLLY AROMATIC POLYAMIDE MOLDING RESIN
Frank M. Berardinelli, 121 Rolling Hill Drive, Millington, N.J. 07946, and Saunders E. Jamison, 26 Webster Ave., Summit, N.J. 07901
No Drawing. Filed Dec. 18, 1970, Ser. No. 99,723
Int. Cl. C08g 51/04, 51/08, 51/44
U.S. Cl. 260—37 N
14 Claims

ABSTRACT OF THE DISCLOSURE

A process of blending an aromatic polyamide resin with reinforcing fillers comprising precipitation of the polyamide resin from a dilute solution and therafter mixing the polyamide resin and reinforcing fillers together, in a liquid environment and removing the liquid.

BACKGROUND OF THE INVENTION

Field of the invention

The present invention relates to a process for preparing a reinforced wholly aromatic polyamide molding resin; the resin having the repeating structural unit:

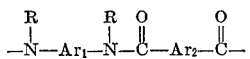

wherein R is hydrogen or lower alkyl and $Ar_1$ and $Ar_2$ are divalent aromatic radicals; and, to a process for blending of these polyamide resins with reinforcing fillers. More particularly, the present invention relates to a process for preparing a wholly aromatic polyamide molding resin, according to the above definition, wherein the intralinear polymer bonds are attached directly to non-adjacent carbon atoms in the respective aromatic rings: Preferred embodiments of the present invention have the intralinear polymer bonds being positioned meta to each other in 50–80 percent of the $Ar_1$ radicals and in the para position in the remaining $Ar_1$ radicals; the intralinear polymer bonds of the $Ar_2$ radicals, as stated above, being either meta or para to each other. The most preferred embodiments of the composition have, in addition to the above described intralinear polymer bond configuration in the $Ar_1$ radicals, the intralinear polymer bonds of the $Ar_2$ radicals positioned meta to each other in at least 80 percent of the radicals and in the para position in the remaining radicals.

Description of the prior art

Wholly aromatic polyamides, in the form of filaments and films, have recently become prominent due to their unique combination of physical and chemical properties, most notably, resistance to corrosive atmospheres and substantial nonflammability. Exemplary prior art directed to the preparation and subsequent processing of these polyamides into filaments and films includes U.S. Pat. Nos. 3,094,511, 3,287,324, 3,354,127 and 3,380,969.

Wholly aromatic polyamides, quite unlike other polyamides begin to thermally degrade at a temperature which is well below the point of high melt-fluidity. As such these resins, again quite unlike other polyamides, are not susceptible to the standard methods of extrusion or injection molding. An article, "Processing Aromatic Polyamides," by L. N. Fomenko et al. in the journal "Soviet Plastics" No. 6, pages 24–28, 1969, details the problems encountered as a result of this characteristic in preparing molded articles of the resin and describes a compression molding process utilizing a heated mold for obviating these problems. This article does not, however, suggest either blending of these polyamide resins with reinforcing fillers or the inherent problems intimately associated in blending of these polyamide resins with reinforcing fillers.

SUMMARY OF THE INVENTION

It was found that the incapacity of these polyamide resins for high melt-flow precluded use of the usual methods, e.g., dry tumbling or melt extrusion, for preparing a blend of these polyamide resins and reinforcing fillers. Specifically, most resins which do melt and flow readily under molding conditions can, because of this quality, compensate during molding for any uniformity inconsistencies occurring in the dry blend of resin and reinforcing filler. Since, however, these polyamide resins do not exhibit high melt-flow, uniformity inconsistencies in the dry blend will not be corrected during molding and, thus will be reflected in the molded article. Therefore, the mixing technique used to prepare the blend must, of itself, result in substantial uniformity throughout the blend if the molded blend is to be free of such inconsistencies.

It was found that dry tumbling of these polyamide resins and reinforcing fillers could not consistently provide the desired uniformity. This inability was also found to be more a creature of these particular polyamide resins than it was a deficiency in the blending technique, per se. That is the particles of the polyamide resins, as they are formed during precipitation from the reaction solution, are relatively large and, thus, present a relatively small total available surface area and relatively few inter-particle interstices for contact with the particles of reinforcing filler. As such articles molded of a dry tumbled blend of wholly aromatic polyamide resin and reinforcing filler had, upon close examination, noticeable areas of polyamide resin and noticeable areas of reinforcing filler.

Melt extrusion blending was found to be inappropriate since, as stated, these polyamide resins will characteristically begin to thermally degrade at temperatures well below the point of high melt-fluidity.

The present invention overcomes these problems and provides a process of intimately and uniformly blending together a wholly aromatic polyamide resin and a reinforcing filler. Briefly, the process involves, first, preparing a dilute solution of the wholly aromatic polyamide resin and then precipitating the polyamide resin from this solution as a fine powder, the particles of which now have a "branch-like" appearance. These reformed, restructured particles are then mixed together with the reinforcing filler in a liquid environment and the blend of solids subsequently separated from the liquid. Conjoint use of this reprecipitation-reinforcing process for the polyamide resin followed by mixing, of the reformed, precipitated polyamide resin with the reinforcing filler in a liquid environment results, upon removal of the liquid, in particles of reinforcing filler becoming intimately engaged and entrapped in the branched configuration of the individual particles of polyamide resin. Thus, the blend of polyamide resin and reinforcing filler is substantially consistent and uniform throughout and correspondingly provides uniform molded articles.

Accordingly, the present invention provides a method of uniformly blending together a wholly aromatic polyamide molding resin and a reinforcing filler. The present invention further provides a process for preparing an improved molding resin comprising a blend of a reinforcing filler and a wholly aromatic polyamide having the repeating structural unit:

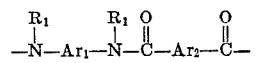

wherein $R_1$ is hydrogen or lower alkyl and $Ar_1$ and $Ar_2$ are divalent aromatic radicals, which resin has excellent and improved dimensional stability at elevated temperatures relative to unreinforced polyamide resin, is readily machineable, has low friction characteristics and is dimensionally stable.

DETAILED DESCRIPTION OF THE INVENTION

The wholly aromatic polyamides which are contemplated as the base of the molding resin of the present invention are of high molecular weight and have the following repeating structural unit:

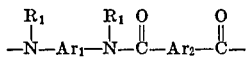

wherein $R_1$ is selected from the group consisting of hydrogen and lower alkyl, and $Ar_1$ and $Ar_2$ are divalent aromatic radicals. In the preferred embodiments, the intralinear polymer bonds are attached directly to non-adjacent carbon atoms in the respective aromatic rings; the bonds being arranged in the meta position in 50–80 percent of the $Ar_1$ radicals and in the para position in the remaining $Ar_1$ radicals; the intralinear polymer bonds of the $Ar_2$ radicals being either meta or para to each other. The most preferred embodiments have, in addition to the preceding intralinear polymer bond configuration in the $Ar_1$ radicals, the intralinear polymer bonds of the $Ar_2$ radicals positioned meta to each other in at least 80 percent of the radicals and the para position in the remaining radicals. The high molecular weight polymer utilized in this invention is termed "aromatic polyamide." This term refers to a polymer wherein aromatic radicals are linked by a carbon-amide group, i.e., the

radical ($R_1$ being the same as above indicated), the nitrogen and carbonyl of each repeating carbonamide radical being directly attached to a carbon atom in the ring of an aromatic radical; that is, the nitrogen and carbonyl of each repeating carbonamide group each replaces a hydrogen of an aromatic ring. Exemplary aromatic radicals have the following structural formulas:

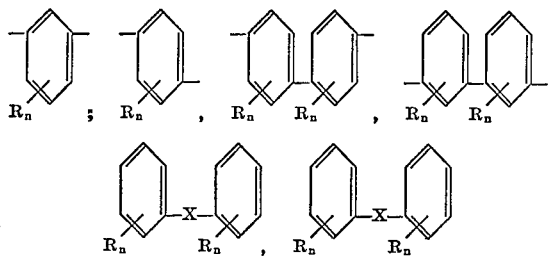

in which R is preferably a lower alkyl, lower alkoxy, or halogen group, $n$ is a number from 0–4, inclusive, and X is preferably one of the groups of

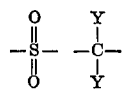

and —O—, in which Y is a hydrogen or a lower alkyl group, X may also be a lower alkylene or lower alkylene dioxy group although these are somewhat less desirable. R may also be a nitro, lower carbalkoxy, or other non-polyamide-forming group. All of these aromatic radicals are divalent and meta or para oriented, i.e., the unsatisfied bonds of the radicals (the "intralinear bonds" when the radical is viewed in the repeating unit of the structural formula of the polymer) are meta or para oriented with respect to each other. One or more of the aromatic radicals may contain substituent groups as indicated and any aromatic ring may contain two or more of the same or different substituent groups. The total number of substituent groups or carbon atoms attached to any aromatic ring is desirably less than about four and preferably all the aromatic radicals are phenylene.

The high molecular weight polymers are prepared by reacting in a suitable solvent system at low temperature (below 100° C.) a mixture of at least one aromatic dicarboxylic acid halide, preferably the chloride, with a mixture of aromatic diamine. The solvent system may comprise a separate solvent for the aromatic dicarboxylic acid halide and a separate solvent for the aromatic diamine. Most preferably, a mutual solvent such as anhydrous gamma butyrolactone in conjunction with an amine said acceptor such as 2,6-lutidine, is used. Aromatic dicarboxylic acid halide useful as reactants in preparing polymers of the present invention are compounds of the formula

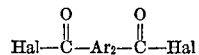

wherein $Ar_2$ is a divalent aromatic radical and Hal is a halogen atom of the class consisting of chloride, bromine, and fluorine. The aromatic radical may have a single, multiple, or fused ring structure. One or more hydrogens of the aromatic nucleus may be replaced by non-polyamide-forming groups such as lower alkyl, lower alkoxy, halogen, nitro, sulfonyl, lower carbalkoxy, and the like. The terms "lower alkyl" and "lower alkoxy" and "lower carbalkoxy" refer to groups containing from one to five carbon atoms. Preferably the acid halide groups of these aromatic diacid halides are meta or para to each other and at least 80 percent by weight of the mixture is a compound with the acid halide groups positioned meta to each other.

Aromatic dicarboxylic acid chlorides which may be utilized to prepare the polyamides of this invention include isophthaloyl chloride and lower alkyl isophthaloyl chlorides, such as methyl, ethyl, propyl, etc., isophthaloyl chlorides. There may be more than one alkyl group attached to the aromatic ring as in the case of dimethyl, trimethyl, tetramethyl, diethyl, triethyl, and tetraethyl isophthaloyl chlorides. The most preferred reactant is isophthaloyl chloride.

The diamines useful as reactants in forming the polymer of this invention are compounds of the formula

where $R_1$ is hydrogen or lower alkyl, i.e., groups containing from one to five carbon atoms, and $Ar_1$ is a divalent aromatic radical, as defined above, and the $NHR_1$ groups are usually oriented meta or para with respect to each other, and 50–80 percent by weight of the mixture is a compound with the amino groups positioned meta to each other. The diamines may contain single or multiple rings as well as fused rings. One or more hydrogens of the aromatic nucleus may be replaced by non-polyamide-forming groups such as lower alkyl, lower alkoxy, halogen, nitro, sulfonyl, lower carbalkoxy.

Exemplary aromatic diamines which may be utilized in this invention includes meta-or-para-phenylene diamine and lower alkyl substituted derivatives thereof such as methyl, ethyl, propyl, and butyl meta-or-para-phenylene diamine, N,N'-dimethyl meta-or-para-phenylene diamine, N,N'-dimethyl meta-or-para-phenylene diamine, etc. There may be more than one alkyl group attached to the aromatic ring as in the case of dimethyl, trimethyl, tetramethyl, diethyl, and triethyl meta-or-para-phenylene diamine. The alkyl substituent groups need not be the same because compounds such as 2-methyl-4-ethyl meta-or-para-phenylene diamine and 2-methyl-4-ethyl-5-propyl meta-or-para-phenylene diamine may be utilized. In place of the alkyl group, the aromatic ring may be substituted with one or more lower alkyl groups such as, for example, methoxy, ethoxy, propoxy, butoxy, meta-or-para-phenylene diamine. Other representative aromatic diamines which may be utilized include, dimethoxy, trimethoxy, tetramethoxy, diethoxy meta-or-para-phenylene diamine. Halogen-substituted meta-or-para-phenylene diamine as exemplified by chloro, bromo, and fluoro meta-or-para-phenylene diamine may be utilized. More than one halogen may be attached to the aromatic ring. The halogens in these compounds may be the same or different as in the case of the dihalo compound. Other meta-or-para-phenylene diamines which may be used include nitro and lower carbalkoxy meta-or-para-phenylene diamines. One or more of the latter groups may be attached to the aromatic nucleus along with one or more alkyl, alkoxy, or halogen groups. Mixtures of different diamine compounds may also be used. In fact, the most preferred reactant is a 70/30 molar mixture of meta-or-para-phenylene diamine. The desired intrinsic viscosity of the resultant polymer is at least 0.5 deciliters/gram.

Reinforcing fillers contemplated by the present invention include among others graphite, glass fibers (chopped and continuous roving) asbestos fibers, mica, cellulose fibers, cotton fabric paper, synthetic fibers, metallic powders and the like. The presence of reinforcing filler can range from about 2 to about 70 weight percent, preferably from about 5 to about 60 weight percent based on the total molding composition.

It was found that the characteristic of these wholly aromatic polyamide resins to thermally degrade at a temperature well below the point of high melt-fluidity precluded utilizing standard techniques, e.g., dry tumbling or melt extrusion, for preparing a blend of these polyamide resins and reinforcing fillers. More particularly, resins which are capable of high melt flow can, and often do, compensate for variations in the consistency of the blend as they flow in the melt stage. Since, however, these polyamide resins will not exhibit high melt-flow any uniformity variations present in the blend prior to molding will be present in the molded article. Accordingly, the method chosen for preparing the blend, must, of itself, consistently assure substantial uniformity throughout the blend.

Dry tumbling was found inadequate more as an inherent consequence of the polyamide resin than of the technique, per se. Specifically, the particles of polyamide resin as they are formed during precipitation from the reaction solution are relatively large and thus the resin has a relatively small available surface area per gram with relatively few inter-particle interstices for contact with the particles of reinforcing filler. As such articles molded of a dry tumbled blend of wholly aromatic polyamide resin and reinforcing filler are characterized by noticeable areas of polyamide resin and noticeable areas of reinforcing filler.

Melt extrusion blending is also inapplicable since, as stated, these polyamide resins will begin to thermally degrade at a temperature well below the point of high melt-fluidity.

The present invention overcomes the inherent difficulties of these polyamide resins by a two-fold process comprising, first, reprecipitation of the polyamide resin from a dilute solution to alter its physical configuration from that of a generally spheroid particle to that of a branched or feather-like structure; and, second, mixing the reformed polyamide resin with the reinforcing filler in a liquid environment to interengage and entrap the particles of reinforcing filler within and about the branches of the particles of polyamide resin.

By the first step of this process, it has been found that the configuration of the wholly aromatic polyamide resin, measured as a function of the surface area per gram, is dramatically altered, relative to the original "as reacted" form. For example, in one typical experimental run, the available surface area per gram of the wholly aromatic polyamide resin as it precipitated from solution after reaction between equimolar ratios of isophthaloyl chloride and a 70:30 molar ratio of meta-phenylene diamine and para-phenylene diamine was 13.4 square meters. However, after reprecipitation from a 5 percent solution, in a manner to be more fully described hereinafter, the surface area per gram was 81.9 square meters. This more than six-fold increase in available surface area coupled with the new, branched configuration, afforded by the first step of the present invention correspondingly provides an increase in sites for intimate engagement between the polyamide resin and the reinforcing filler. By the second step of the present process the particles of reinforcing filler become entangled and entrapped in the branch-like structure of the polyamide resin particles resulting in an intimate, and consistently uniform blend; and, correspondingly, a consistently uniform molded article.

Suitable solvents for dissolving the wholly aromatic polyamide resin commonly referred to as "super solvents" include aromatic amines, amides, cyclic amides, lactones, substituted sulfoxides and cyclic sulfones, e.g., dimethyl acetamide, N-methyl pyrrolidone, dimethyl sulfoxide, tetramethylene sulfone, dimethyl formamide, hexamethyl phosphoramide, gamma butyrolactone and 2,6-lutidine. Concentration of the polyamide resin in the solvent should be from about 0.1 to less than about 20 percent, preferably less than about 10 percent and most preferably around 5 percent. Concentrations much higher than the preferred amounts result, upon precipitation, in large agglomerates of low surface area per gram, which is unsuitable for purposes of the present invention.

The reinforcing filler can be introduced while the polyamide resin is still in solution; the polyamide resin can then be precipitated by addition of a suitable non-solvent for the polyamide resin, such as water, acetone, or the lower order alcohols, the mixture stirred and the solids separated from the liquid, by, for example, filtration. Alternatively, the introduction of reinforcing filler can be withheld until the polyamide resin has first been precipitated from the solution and separated from the solvent. By this procedure, a slurry of the reinforcing filler using, for example, methanol, ethanol or acetone, and the like, as the carrier for the reinforcing filler, is mixed with the polyamide resin precipitate, and then the solids separated from the liquid, such as by filtering.

Other additives for appearance and property improvements such as colorants, plasticizers, stabilizers, hardeners and the like can be incorporated into the molding resin of this invention.

The following examples will serve to illustrate the invention without limiting the same.

EXAMPLE I 50 grams of an aromatic polyamide prepared by the reaction of equimolar ratios of isophthaloyl chloride and a 70:30 molar ratio of meta-phenylene diamine and para-phenylene diamine, the reaction occurring in a solution of 1.17 parts gamma-butyrolactone and 24 parts 2,6-lutidine, were dissolved in 1 liter of N,N'-dimethyl acetamide to make a 5 percent polymer solution. 34 grams of graphite, sufficient to make 40 percent graphite 60 percent polymer blend, was added to the solution and the mixture was stirred for ten minutes. The polymer graphite mixture was precipitated into 3 liters of water in a Waring Blendor. The resultant slurry comprised of precipitated polymer and graphite was then filtered, washed with water and dried.

EXAMPLE II 50 grams of an aromatic polyamide prepared by the method described in Example I were added to 1 liter of N,N'-dimethyl acetamide to make a 5 percent polymer solution. The polymer was precipitated as a fine powder by mixing the solution for 15 minutes, in a Waring Blendor with 3 liters of water. The precipitated polymer was filtered, washed once with water and once with acetone. A slurry of 34 grams of graphite powder in 3 liters of acetone, sufficient to make a 40 percent graphite and 60 percent polymer blend, was stirred with the acetone wet polymer, the mixture was filtered and the filtrate then dried.

In a similar manner to Examples I and II samples of the reprecipitated aromatic polyamide are solution blended with glass, asbestos, mica, cellulose fibers, cotton fabric paper, synthetic fibers, metallic powders and the like.

EXAMPLE III

The wholly aromatic polyamide polymer graphite blend, prepared according to Example II was air dried and passed through a mill to break up agglomerates; it was then allowed to dry overnight at 120° C. under vacuum (29-30 inches of mercury). A preform was then pressed at room temperature in a one inch by three inch compression mold under 20,000 p.s.i. The preform was successively evacuated at 120° C. for more than ten hours, preheated and thoroughly dried at 260° C. for more than one hour prior to molding. Molding was performed in a one inch by three inch heated mold in a heated press at 300° C. or higher under 20,000 p.s.i. Molding time for a 5 gram, 1/16 inch thick test specimen was 3 minutes; for a 60 gram, ¾ inch thick test specimen the molding time was ten minutes. The mold was water-cooled under pressure before removal of the specimen.

The following flexural strength and modulus data was generated from a 0.06-0.07 inch thick test bar.

TABLE.—FLEXURAL PROPERTIES OF MOLDED MPI PLAQUES

| Molding | | Graphite content, percent | 23° flexural | | 200° flexural | | 260° flexural | |
|---|---|---|---|---|---|---|---|---|
| Temp. (° C.) | Time (min.) | | Strength (p.s.i.) | Modulus ($10^6$ p.s.i.) | Strength (p.s.i.) | Modulus ($10^6$ p.s.i.) | Strength (p.s.i.) | Modulus ($10^6$ p.s.i.) |
| 280 | 5 | 0 | 16,500 | 0.9 | 7,300 | 0.6 | 4,400 | 0.36 |
|  |  | 20 | 15,100 | 1.05 | 7,450 | 0.73 | 5,200 | 0.5 |
|  |  | 30 | 13,100 | 1.14 | 7,600 | 0.85 | 7,200 | 0.6 |
|  |  | 40 | 11,900 | 1.13 | 7,500 | 0.86 | 7,000 | 0.8 |
| 300 | 2 | 0 | 22,000 | 0.8 | | | 8,800 | 0.6 |
|  | 6 | 0 | 18,000 | 0.8 | | | 10,200 | 0.55 |
|  | 3 | 40 | 16,000 | 1.0 | | | 8,200 | 0.7 |
| 320 | 3 | 0 | 23,000 | 0.7 | | | 12,000 | 0.5 |
|  | 10 | 0 | 22,000 | 0.8 | | | 12,000 | 0.5 |
|  | 3 | 30 | 20,000 | 1.0 | | | 8,700 | 0.8 |
| 330 | 3 | 0 | 22,000 | 0.7 | | | 10,500 | 0.4 |
|  | 3 | 40 | 21,000 | 1.1 | | | 9,200 | 0.7 |
| 340 | 3 | 40 | 22,000 | 1.2 | | | 10,100 | 0.9 |
| 360 | 3 | 0 | 23,000 | 0.9 | | | 8,400 | 0.3 |

From the above information it can be appreciated that at each of the testing temperatures, i.e., 23° C., 200° C. and 260° C. as the graphite content increased the flexural modulus, which is a measure of stiffness, increased. More importantly though, it can be seen by a comparison of this data that for an unfilled sample the loss in flexural modulus was substantially higher as temperature increased when compared with a graphite filled sample. For example, in going from 23° C. to 260° C. as the test temperature, the unfilled sample lost 60 percent of its modulus whereas the 40 percent graphite filled sample lost only 29 percent; less than half of the unfilled sample. Equally as significant, the increase in modulus at a temperature of 23° C., between an unfilled sample and a graphite filled sample is only 25.5 percent whereas the increase in modulus at 200° C. between the graphite filled and unfilled samples amounts to 43.3 percent and at 260° C. to 122 percent. This unexpected substantial retention in stiffness at high temperatures presents several unique advantages and uses for this material, such as for structural or support members in high temperature environments.

Similarly, and also unexpectedly it will be noted that the loss in flexural strength as test temperature is increased from 23° C. to 260° C. is significantly less for the graphite filled samples than it is for the unfilled sample bar. Note particularly the 30 and 40 percent graphite levels which one would normally expect to dissipate strength fastest, since they contain the least amount of polymer. They, in fact, not only lose strength slower, but are stronger at elevated temperatures than the sample bars without graphite.

In addition, it has been found that when the polymer is reinforced with graphite it has an advantageous friction profile rendering the polymer suitable for use in high temperature non-lubricated bearings, etc.

As this invention may be embodied in several forms without departing from the spirit or essential character thereof, the present embodiments are illustrative and not restrictive. The scope of the invention is defined by the appended claims rather than by the description preceding them and all embodiments which fall within the meaning and range of equivalency of the claims are, therefore, intended to be embraced by those claims.

What is claimed:

1. A process for blending reinforcing fillers with wholly aromatic polyamide molding resin comprising dissolving a wholly aromatic polyamide resin having the repeating structural unit:

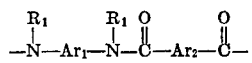

wherein $R_1$ is selected from the group consisting of hydrogen and lower alkyl, and $Ar_1$ and $Ar_2$ are divalent aromatic radicals in a solvent therefor, precipitating said polyamide resin from said solution whereby the surface area of said aromatic polyamide resin is increased, mixing the polyamide resin with said reinforcing filler in a liquid environment, separating the solids portion of the mixture from the liquid portion and drying the solids portion comprising the reinforced wholly aromatic polyamide molding resin.

2. A process as defined in claim 1 wherein the solvent is selected from the group consisting of substituted sulfoxides, cyclic sulfones, amides, cyclic amides, lactones and aromatic amines.

3. A process as defined in claim 2 wherein the concentration of the polyamide resin in the solution is less than about 20 percent.

4. A process as defined in claim 2 wherein the concentration of polyamide in the solution is about 5 percent.

5. A process as defined in claim 1 wherein the reinforcing filler is selected from the group consisting of: graphite, glass, asbestos, molybdenium disulfide, mica, cellulose fibers, cotton fabric paper, synthetic fibers and metallic powders and is present in an amount of from about 2 to about 70 percent of the total composition.

6. A process as in claim 1 wherein the reinforcing filler is graphite.

7. A process for blending reinforcing fillers with wholly aromatic polyamide molding resins comprising dissolving a wholly aromatic polyamide resin having the repeating structural unit:

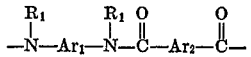

wherein $R_1$ is selected from the group consisting of hydrogen and lower alkyl, and $Ar_1$ and $Ar_2$ are divalent aromatic radicals in a solvent therefor, introducing the reinforcing filler to said solution, precipitating the polyamide resin from said solution whereby the surface area of said aromatic polyamide resin is increased, mixing the precipitated polyamide resin and the reinforcing filler, and thereafter separating the precipitated polyamide resin and reinforcing filler from said solvent.

8. A process as defined in claim 7 wherein the concentration of the polyamide resin in the solution is less than about 20 percent.

9. A process as defined in claim 7 wherein the concentration of the polyamide resin in the solution is less than about 5 percent.

10. A process as defined in claim 5 wherein the solvent is selected from the group consisting of substituted sulfoxide, cyclic sulfones, amides, cyclic amides, lactones and aromatic amines.

11. A process as defined in claim 7 wherein the reinforcing filler is selected from the group consisting of: graphite, glass, asbestos, molybdenum disulfide, mica, cellulose fibers, cotton fabric paper, synthetic fibers and metallic powders and is present in an amount of from about 2 to about 70 percent of the total composition.

12. A process as defined in claim 7 wherein the reinforcing filler is graphite.

13. A process as defined in claim 1 wherein said solids portion is mechanically separated from said liquid portion.

14. A process as defined in claim 7 wherein said precipitated resin and said filler are mechanically separated from said solvent.

References Cited

UNITED STATES PATENTS

| | | | |
|---|---|---|---|
| 3,472,819 | 10/1969 | Stephens | 260—78 |
| 3,591,673 | 7/1971 | Pollack | 260—176 |
| 3,228,902 | 1/1966 | Beste | 260—29.2 |
| 3,094,511 | 6/1963 | Hill | 260—78 |
| 3,296,201 | 1/1967 | Stephens | 260—47 |
| 3,554,966 | 1/1971 | Jones et al. | 260—47 |
| 3,419,517 | 12/1968 | Hedrick et al. | 260—37 |

ALLAN LIEBERMAN, Primary Examiner

U.S. Cl. X.R.

260—9, 30.2 R, 30.8 DM, 32.6 NA, 857